(12) United States Patent
Mulder

(10) Patent No.: US 8,191,931 B1
(45) Date of Patent: Jun. 5, 2012

(54) WOODEN PUSH OR BALANCE BICYCLE

(76) Inventor: Oscar Vincent Mulder, Sausalito, CA (US)

( * ) Notice: Subject to any disclaimer, the term of this patent is extended or adjusted under 35 U.S.C. 154(b) by 0 days.

(21) Appl. No.: 13/136,254

(22) Filed: Jul. 26, 2011

(51) Int. Cl.
*B62M 1/00* (2010.01)
(52) U.S. Cl. ........................................ 280/828; D12/111
(58) Field of Classification Search ................. 280/828, 280/829–1.23; D21/432; D12/111, 112, D12/107
See application file for complete search history.

(56) References Cited

U.S. PATENT DOCUMENTS

| | | | | | |
|---|---|---|---|---|---|
| D50,882 | S | * | 6/1917 | Case | D12/112 |
| D56,415 | S | * | 10/1920 | Case | D12/112 |
| 1,587,930 | A | * | 6/1926 | Wetzel | 280/223 |
| D83,033 | S | * | 1/1931 | Cottam | D12/108 |
| 1,910,018 | A | * | 5/1933 | Jones | 280/7.17 |
| D139,802 | S | * | 12/1944 | Hanscom | D12/112 |
| D157,322 | S | * | 2/1950 | Baretta | D12/111 |
| 2,759,736 | A | * | 8/1956 | Block | 280/1.182 |
| D231,345 | S | * | 4/1974 | Gutknecht | D12/111 |
| D504,845 | S | * | 5/2005 | Coerschulte | D12/111 |
| D537,758 | S | * | 3/2007 | Grepper | D12/111 |
| D561,649 | S | * | 2/2008 | Latham et al. | D12/111 |
| D567,149 | S | * | 4/2008 | Grepper | D12/111 |

* cited by examiner

*Primary Examiner* — Tony Winner
(74) *Attorney, Agent, or Firm* — Risto A. Rinne, Jr.

(57) ABSTRACT

An apparatus for training children to learn to balance and ride a bicycle is provided. A wooden bicycle includes a two-piece frame secured at one end, thereof. The frame may be painted with a special type of paint or it may include a natural wood finish. The paint allows for a customization of the frame with chalk. The frame includes a downward curvature that allows a smaller and/or younger child to use the bicycle. An adjustable seat is provided with a removable seat cushion. A pair of foot pegs are included on the frame which helps the child to improve their balance. A wooden handlebar with a pair of foam grips bar is used to steer and maneuver the bicycle. A pair of wooden wheels are provided that each include a pneumatic air or solid tire. An instruction manual for assembly and required tools and parts are also included.

11 Claims, 2 Drawing Sheets

WOODEN PUSH OR BALANCE BICYCLE

BACKGROUND OF THE INVENTION

1. Field of the Invention

The present invention, in general, relates to bicycles and, more particularly, to a training bicycle for children.

Younger and smaller children are always trying to keep up with older children and adults. They want to be included in activities and often have a desire to act just like their older siblings or other older individuals they observe. If an older child has mastered the technique of riding a bicycle, the younger and smaller child will want to do just the same. However, the younger child's motor skills and balance coordination may not be developed enough to be ready to ride a conventional-style bicycle.

Learning to ride a bicycle is sometimes a challenging experience for children. Some children may experience fear and anxiety over learning the proper techniques on how to balance themselves once on the bicycle. These fears may hinder their confidence in learning how to ride the bicycle and they may be quick to give up on trying. Even with adult supervision, children may not feel safe and sure of themselves.

The accomplishment of learning how to successfully ride a bicycle is often viewed as a rite of passage. It affords a child a sense of freedom and serves as a stepping stone to build confidence in trying new things.

A common way to introduce riding a bicycle to a child is to install training wheels on a conventional-type of bicycle. The training wheels are mounted on opposite sides of the bicycle frame and are used to increase stability of the rider. The training wheels provide an additional set of wheels on a rear tire that help keep the bicycle steady and upright. The training wheels can also offer a sense of security to the rider.

The training wheels remain on the bicycle until the rider has mastered balance and maneuvering of the bicycle. After the rider feels confident in their riding ability, the training wheels are removed.

However, some children may not appreciate the look of training wheels. The training wheels to them may constitute that they are not yet ready to ride a bicycle without assistance. In addition, the training wheels are not aesthetically pleasing once mounted on the bicycle. The child may not want to ride the bicycle with the training wheels as they may feel it shows others (i.e., older siblings) that they are in need of assistance or have not fully learned how to ride the bicycle.

Also, children may delay learning how to properly balance themselves on a bicycle by leaning toward one side and developing a reliance on use of the training wheels.

Other prior art devices that are designed to help stabilize a child upon a normal conventional-type of bicycle are also not aesthetically pleasing once installed.

For example, an enlarged U-shaped member can be installed at a rear of the bicycle to allow an adult to hold onto the bicycle in order to help steady and guide the child. However, if the child builds up enough momentum and begins to move faster than the adult is moving, it may become difficult for the adult to maintain their hold on the bicycle. The child will then be riding on their own, which may lead the child to fall over if they cannot properly balance themselves. The child may then be subject to potential injury or emotional trauma if they are not yet ready to be riding on their own.

A solution to these disadvantages is the push or balance bicycle. It does not have a pedal, crank, and chain. Rather, it is urged forward by contact of the child's feet with a ground surface pushing the bicycle and the child forward. In this way, the child learns balance and steering. Still, prior art push and balance bicycles have certain disadvantages.

Certain versions of the push or balance bicycle do not include an area for a child to place their feet while the bicycle is in motion. The child can be easily confused as to where to place their feet while riding the bicycle. If the child has built up enough momentum to coast, there is no proper location on the push or balance bicycle for the child to place their feet. The child will need to either suspend their feet in the air above the ground surface or drag them across the ground, which will ultimately stop motion of the bicycle.

Also, children may not be able to reach the ground with a standard shape frame and available adjustment in the seat height of certain push or balance bicycles.

Additionally, children desire a unique appearance to their bicycle and have a wish to customize its appearance. Yet, as their interests change, which can occur on a daily basis, they would like to readily change the customizing.

Accordingly, there exists today a need for a wooden push or balance bicycle that helps to ameliorate the above-mentioned problems and difficulties as well as ameliorate those additional problems and difficulties as may be recited in the "OBJECTS AND SUMMARY OF THE INVENTION" or discussed elsewhere in the specification or which may otherwise exist or occur and that are not specifically mentioned herein.

As various embodiments of the instant invention help provide a more elegant solution to the various problems and difficulties as mentioned herein, or which may otherwise exist or occur and are not specifically mentioned herein, and by a showing that a similar benefit is not available by mere reliance upon the teachings of relevant prior art, the instant invention attests to its novelty. Therefore, by helping to provide a more elegant solution to various needs, some of which may be long-standing in nature, the instant invention further attests that the elements thereof, in combination as claimed, cannot be obvious in light of the teachings of the prior art to a person of ordinary skill and creativity.

Clearly, such an apparatus for helping children transition to riding a conventional type of bicycle would be useful and desirable.

2. Description of Prior Art

Push and balance training bicycles for children are, in general, known.

For example, the following websites describe various types of these devices, some of which may have some degree of relevance to the invention. The inclusion of these devices is not an admission that their teachings anticipate any aspect of the invention. Rather, their inclusion is intended to present a broad and diversified understanding regarding the current state of the art appertaining to either the field of the invention or possibly to other related or even distal fields of invention.

LIKEABIKE™, likeabikeusa.com

SKUUT™, skuut.com

While the structural arrangements of the above described devices may, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a wooden push or balance bicycle that is made from wood.

It is also an important object of the invention to provide a wooden push or balance bicycle that is easy to use.

Another object of the invention is to provide a wooden push or balance bicycle that includes a frame that is available in a variety of colors.

Still another object of the invention is to provide a wooden push or balance bicycle that includes a frame that includes a downward or concave curvature in the frame design to allow a smaller child to use the bicycle.

Still yet another object of the invention is to provide a wooden push or balance bicycle that includes a frame that is painted with a special type of paint.

Yet another important object of the invention is to provide a wooden push or balance that includes a frame that is painted with a special type of paint that allows for a customization or writing on the frame with a piece of chalk.

Still yet another important object of the invention is to provide a wooden push or balance bicycle that includes an adjustable seat to accommodate various heights of children.

A first continuing object of the invention is to provide a wooden push or balance bicycle that includes an adjustable seat with a removable seat cushion that is detachably-attachable with respect to the adjustable seat.

A second continuing object of the invention is to provide a wooden push or balance bicycle that includes a removable seat cushion that is disposed within a fabric covering.

A third continuing object of the invention is to provide a wooden push or balance bicycle that includes a removable seat cushion disposed within a fabric covering and wherein the fabric covering is also removable.

A fourth continuing object of the invention is to provide a wooden push or balance bicycle that includes a removable seat cushion disposed within a fabric covering and wherein the fabric covering is washable.

A fifth continuing object of the invention is to provide a wooden push or balance bicycle that includes a handlebar portion.

A sixth continuing object of the invention is to provide a wooden push or balance bicycle that includes a handlebar portion wherein the handle bar portion includes a pair of foam grips that are disposed on each end, thereof.

A seventh continuing object of the invention is to provide a wooden push or balance bicycle that includes a set of wooden wheels.

An eighth continuing object of the invention is to provide a wooden push or balance bicycle that includes a set of wooden wheels wherein each wheel includes a pneumatic air tire.

A ninth continuing object of the invention is to provide a wooden push or balance bicycle that includes a set of wooden wheels wherein each wheel includes a solid tire.

A tenth continuing object of the invention is to provide a wooden push or balance bicycle that helps a child learn how to balance themselves upon two wheels.

An eleventh continuing object of the invention is to provide a push or balance bicycle that includes wooden foot pegs or footrests for a child to rest their feet while coasting.

A twelfth continuing object of the invention is to provide a wooden push or balance bicycle that allows a child to prepare for riding a conventional-type of bicycle.

A thirteenth continuing object of the invention is to provide a wooden push or balance bicycle that provides an alternative to a use of training wheels.

A fourteenth continuing object of the invention is to provide a wooden push or balance bicycle that is capable of carrying a load of up to seventy pounds.

A fifteenth continuing object of the invention is to provide a wooden push or balance bicycle that includes a complete set of parts and required tools for an assembly of the bicycle.

A sixteenth continuing object of the invention is to provide a wooden push or balance bicycle that includes an instructional manual to help aid in an assembly of the bicycle.

A seventeenth continuing object of the invention is to provide a wooden push or balance bicycle that is easy to assemble.

An eighteenth continuing object of the invention is to provide a wooden push or balance bicycle that may be used either outdoors or indoors.

Briefly, a wooden push or balance bicycle that is constructed in accordance with the principles of the present invention has a V-shaped wooden frame. The wooden frame includes a first frame member and a second frame member. The first frame member and the second frame member are secured together only at a front end thereof, and progressively expand toward a rear wheel, which comprises the V-shape of the wooden frame. The first frame member and the second frame member are each designed (i.e., machined) to include a downward or concave curvature along a longitudinal length of each of the frame members. The downward concave curvature begins at a higher elevation at the front end of the frame members and gradually decreases to a lowest point of elevation of the curvature at approximately a middle portion of the frame members. From the middle portion, the elevation again slightly increases towards an opposite rear end of each of the frame members at the rear wheel. This provides each frame member with a slight U-shape at an upper end, thereof. Both the first member and the second member are identical in design. The wood used to form the first frame member and the second frame member may be of any type, (i.e, basswood plywood, birch or beech wood). The downward concave curvature included on each frame member allows a smaller and younger in age child to use the bicycle. An adjustable seat is included at the middle portion (i.e. lowest point of the curvature) of the wooden frame. By having the seat disposed at the lowest point in the curvature, the smaller child is then able to place their feet upon a ground surface. By having the child be able to touch the ground with their feet allows for easier transitions on and off of the bicycle. As the bicycle does not include brakes, the child stops the bicycle by placing their feet on the ground. The adjustable seat may be raised upward or lowered downward in position, depending on a height of the child riding the bicycle. This ensures that the child will be able to place their feet on the ground and comfortably ride the bicycle. The wooden push or balance bicycle is capable of carrying a load (i.e., child) up to seventy pounds. The adjustable seat includes a removable seat cushion. The seat cushion is detachably-attachable with respect to the adjustable seat and preferably includes a hook and loop type fastener (i.e., VELCRO™) as a means for securement. The seat cushion is disposed within a fabric covering that is also removable. The fabric covering can be of any preferred material and include any preferred color or design. The fabric covering is washable should it become dirty. The seat cushion is removed from within the fabric covering prior to washing. The wooden frame of the bicycle is painted with a special type of paint. The paint is designed for writing or drawing with a piece of chalk. This allows for a unique personalization of the frame of the wooden push or balance bicycle. The paint is available in any preferred color. The painted surface of the frame members allows for a child or other individual to write, draw or otherwise customize an exterior of each of the frame members with the piece of chalk (white or any preferred color of chalk). A pair of wooden foot pegs are included at a lower end of an elongated portion that extends downward from the middle portion of each of the frame members. The child is able to place their feet upon the foot pegs while the bicycle is in use. Inclusion of the foot pegs also allows the child to improve their balance skills, as their feet will not be in contact with the ground. Coasting is then possible while the bicycle is in motion. A portion of the front end of the wooden frame is inserted into a felt-lined groove disposed on a forked front member. The front end of the wooden frame is secured into place within the groove by a mounting pin. The mounting pin is inserted through a hole provided in a top portion of the forked front member and extends through a hole provided in the front end of the wooden frame to a bottom end of the groove. A wooden handlebar is secured to the top portion of the forked front member. The handlebar is used to steer and maneuver the wooden push or balance bicycle. The handlebar includes a pair of foam grips, which are molded or otherwise secured onto either side of the handlebar member. A wooden first wheel is included at a lower portion of the forked front member. The first wheel is disposed in between a pair of wooden rods that comprise the forked frame member. A wooden second wheel is included in an interior space provided in between the first frame member and the second frame member and is secured in place at the rear end of the wooden frame. Both the first and the second wheels include a pneumatic air tire which is located around a circumference of the wooden wheels. A preferred pounds per square inch (psi) tire pressure for the tires is thirty-five psi. A solid rubber or plastic tire may also be included with the wooden wheels. The solid tire does not require inflation of air. If the solid tires are included, the pneumatic tires are omitted from the wooden wheels. An instructional users manual is included to provide detailed instructions for assembly and how to properly care for the bicycle. Also included are a complete set of required hardware to secure various parts of the bicycle together and a set of required tools for use in the assembly of the wooden push or balance bicycle.

DETAILED DESCRIPTION OF THE INVENTION

Figure 1:
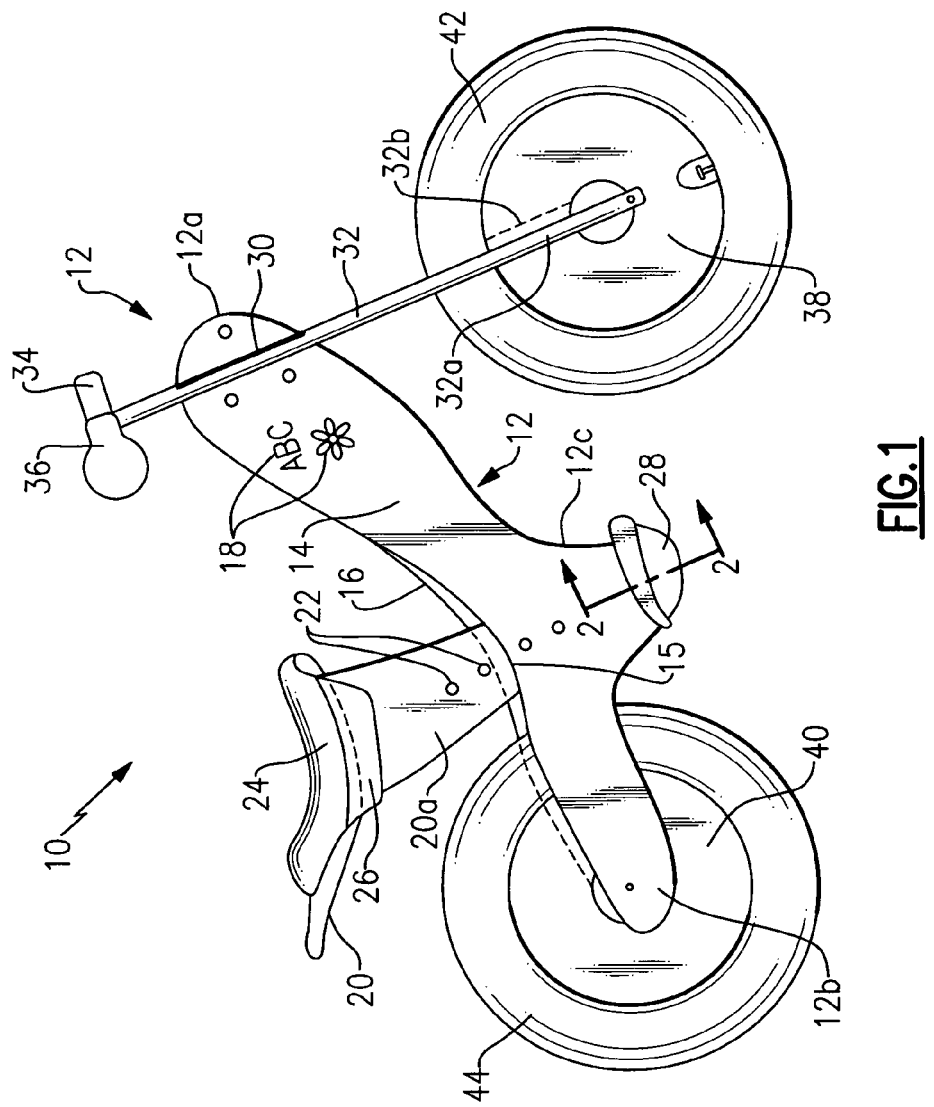
FIG. 1 is a side view of a wooden push or balance bicycle.

Referring on occasion to all of the FIGURE drawings and now, in particular to FIG. 1, is shown a wooden push or balance bicycle, identified in general, by the reference numeral 10.

The reader will notice that reference is occasionally made throughout the DETAILED DESCRIPTION OF THE INVENTION suggesting that the reader refer to a particular drawing FIGURE. The suggestion is at times made when the introduction of a new element requires the reader to refer to a different drawing FIGURE than the one currently being viewed and also when the timely viewing of another drawing FIGURE is believed to significantly improve ease of reading or enhance understanding. To promote rapid understanding of the instant invention the reader is encouraged to periodically refer to and review each of the drawing FIGURES for possible cross-referencing of component parts and for other potentially useful information.

The wooden push or balance bicycle 10 includes a V-shaped wooden frame, identified in general by the reference numeral 12. The wooden frame 12 includes a first frame member 14 and a second frame member 16 (partially hidden, see dashed lines in FIG. 1).

The wood used to form the first frame member 14 and the second frame member 16, which together comprise the wooden frame 12, may be of any desired type such as basswood plywood, birch or beech wood.

The first frame member 14 and the second frame member 16 are secured together at only a front end 12a of the wooden frame 12. From the front end 12a toward an opposite rear end 12b, the first and second frame members 14, 16 progressively diverge. This provides the V-shape of the wooden frame 12.

The first frame member 14 and the second frame member 16 are identical in design and are disposed in a generally side by side orientation with respect to each other.

The first frame member 14 and the second frame member 16 are each designed (i.e., machined) to include a downward or concave curvature 15. The downward curvature 15 begins at a higher elevation at the front end 12a of the frame members 14, 16 and gradually decreases to a lowest point of elevation at approximately a middle portion of each of the frame members 14, 16.

From the middle portion, the curvature 15 begins to slightly rise towards the rear end 12b of the wooden frame 12. This provides each frame member 14, 16 with a slight, gentle U-shape disposed at an upper end of each of the frame members 14, 16. The low point of the frame members 14, 16 occurring at the middle portion provides an important benefit, which allows smaller children to ride, as described in greater detail, hereinafter.

The wooden frame 12 (i.e. first frame member 14 and second frame member 16) may be painted with a special type of paint designed for writing with a piece of chalk. The wooden frame 12 may also include a non-painted, natural wood appearance.

An exterior of each of the frame members 14, 16 are preferably coated with the paint. By painting the wooden frame 12 (i.e., each frame member 14, 16) with this type of paint, it allows for a unique personalization of the wooden push or balance bicycle 10. The special type of paint is available in any preferred color for inclusion on the wooden push or balance bicycle 10.

The paint creates essentially a blank canvas for a child to write, draw or otherwise customize the wooden push or balance bicycle 10. The child may also have others (i.e., parents) create a design for them with the chalk. The child or other individual is then able to create with the piece of chalk (white or any preferred color of chalk) a picture or written message 18 or any other desired customization.

Since the picture or written message 18 is created with chalk, it is therefore not permanent. This allows children or others to customize the wooden push or balance bicycle 10 with the picture or written message 18 to create a design or theme and then later erase the picture or written message 18 and create a new one. The design or theme of the picture or written message 18 can be used to reflect the child's changing hobbies, moods or interests.

As children tend to quickly change their decisions on their interests or what they like, creating the picture or written message 18 with chalk affords an unexpected benefit of endless possibilities of what the wooden push or balance bicycle 10 may look like.

An adjustable seat 20 is disposed proximate the middle portion of the wooden frame 12. The adjustable seat 20 includes an elongated member 20a that extends downward into an interior space provided between the first frame member 14 and the second frame member 16.

An unexpected benefit is provided with the downward curvature 15 included on the wooden frame 12. The adjustable seat 20 is positioned at the middle portion, which is at the lowest point of the downward curvature 15 portion of the wooden frame 12. Having the seat 20 disposed at the middle portion allows for a lowering of the seat 20 closer to a ground surface (not shown) than with prior art types of push or balance bicycles. This permits smaller and younger children (not shown) to easily sit upon the seat 20 and be able to use the wooden push or balance bicycle 10. The child is then able to learn at an earlier age how to balance and maneuver the wooden push or balance bicycle 10, which can then lead to earlier transitioning to a conventional-type of bicycle (not shown).

Yet another unexpected benefit is provided with inclusion of the downward curvature 15 on the wooden frame 12. The downward curvature 15 allows for easier mounting or dismounting of the wooden push or balance bicycle 10. The downward curvature 15 provides ample clearance because of its lower position. Therefore, a leg or a foot of the child, and especially a smaller child, will not make contact with the wooden frame 12.

In addition, having the seat 20 located in the lowest point of the curvature 15 places the child in a position closer to the ground surface and allows the child's feet to easily make contact with the ground surface when necessary.

Another unexpected benefit is provided with the adjustable seat 20. Children of various heights are able to use the wooden push or balance bicycle 10. The adjustable seat 20 is either raised or lowered depending on the height of the rider. Therefore, younger or older children or children of different heights can use the wooden push or balance bicycle 10. Younger or smaller children can start using the wooden push or balance bicycle 10 earlier and can continue using the wooden push or balance bicycle 10 while they grow taller and older. To maintain safety, a recommended load capacity for the wooden push or balance bicycle 10 is seventy pounds.

The elongated member 20a of the adjustable seat 20 includes a series of spaced apart holes 22, which allow the seat 20 to be adjustable in height. The elongated member 20a of the seat 20 is inserted between the interior space between the first frame member 14 and the second frame member 16. A threaded pin (not shown) is inserted through desired hole 22 to attach the elongated member 20a to the wooden frame 12 at a desired height. The threaded pin is then secured with a bolt (not shown) on an opposite side of the hole 22 to secure the adjustable seat 20 in place.

The adjustable seat 20 includes a seat cushion 24. The seat cushion 24 is made from a foam material (i.e., STYROFOAM™), however any preferred material may be used. The seat cushion 24 is disposed within a removable fabric covering 26. The fabric cover 26 may include any preferred color or design. The fabric covering 26 also includes an opening (not shown) on an underside of the covering 26 in which the seat cushion 24 is either inserted or removed.

The fabric covering 26 is made from any preferred fabric, however a durable cotton fabric is preferred. As the covering 26 is made from fabric, it is therefore washable should it become dirty. The seat cushion 24 is removed through the opening prior to washing.

The fabric covering 26 allows the seat cushion 24 to be removable from the seat 20. The fabric covering 26 is detachably-attachable with respect to the seat 20 and preferably includes a hook and loop type fastener (i.e., VELCRO™) as a means for securement.

A pair of foot pegs 28 (only one is shown in FIG. 1) are included at a lower end of an elongated portion 12c of the wooden frame 12. The elongated portion 12c is included on both the first frame member 14 and the second frame member 16. The elongated portion 12c extends downward from a lower end of the middle portion of each of the frame members 14, 16 (i.e., opposite the downward curvature 15).

Figure 2:
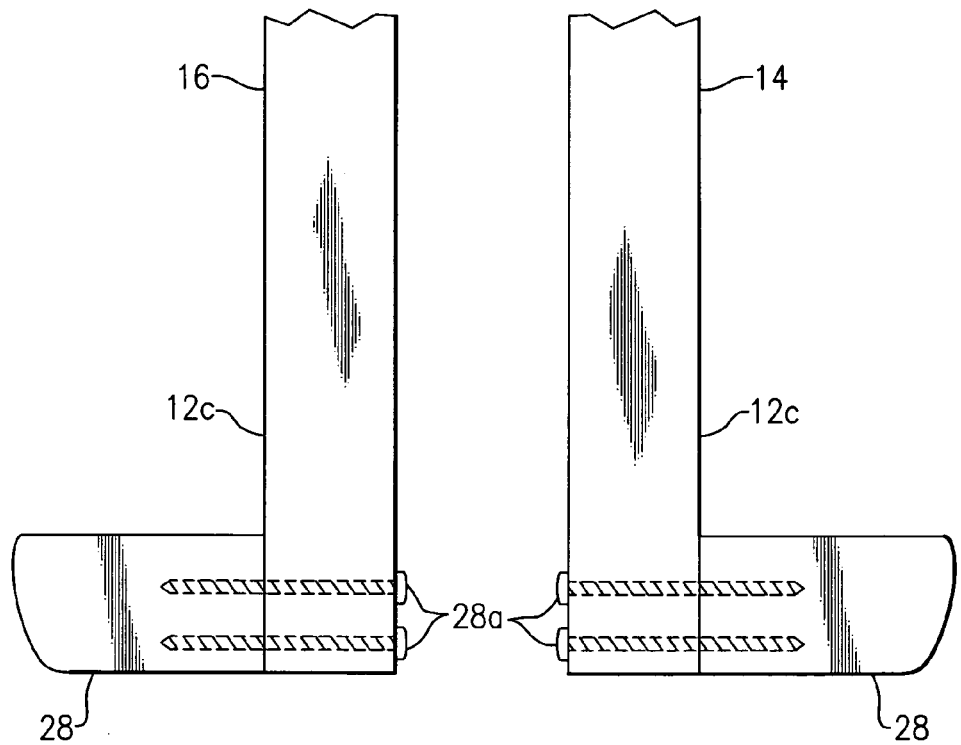
FIG. 2 is a cross-sectional view taken along line 2-2 of FIG. 1.

Now referring to FIG. 2 and also to FIG. 1, is shown the foot pegs 28 taken along line 2-2 of FIG. 1.

The pair of foot pegs 28 extend outward and away from the elongated portion 12c of the wooden frame 12. This provides a surface upon the foot pegs 28 for the child to place their feet while riding the wooden push or balance bicycle 10. The foot pegs 28 are secured to the frame members 14, 16 by threaded screws 28a, or by any preferred means.

Once the child places their feet upon the foot pegs 28 while the wooden push or balance bicycle 10 is in use, they immediately are required to properly balance themselves. By simply riding the wooden push or balance bicycle 10 without letting their feet touch the ground (i.e., by using the foot pegs 28), the child is able to improve their balance skills. After the child has learned to properly balance, coasting is then possible while the wooden push or balance bicycle 10 is in motion.

A portion of the front end 12a of the wooden frame 12 is inserted into a felt-lined groove 30 disposed on a forked front member 32. The front end 12a of the wooden frame 12 is secured into place within the groove 30 by a mounting pin (not shown).

The mounting pin is inserted through a hole provided in a top portion of the forked front member 32 and extends downward through a hole provided in the front end 12a of wooden frame 12 to a bottom end of the groove 30.

A one-piece wooden handlebar 34 is secured to the top portion of the forked front member 32. The handlebar 34 is used to steer and maneuver the wooden push or balance bicycle 10.

The handlebar 34 includes a pair of foam grips 36 (only one is shown in FIG. 1). The foam grips 36 are molded or otherwise directly attached onto either side (i.e., left side and right side) of the handlebar 34. The foam grips 36 may be of any preferred color. The foam grips 36 allow children to easily grasp the handlebar 34 and afford comfort while riding the wooden push or balance bicycle 10.

A wooden first wheel 38 is secured at a lower portion of the forked front member 32. The wooden first wheel 38 is disposed between a pair of wooden rods 32a, 32b (see dashed lines) which comprise the forked frame member 32.

A wooden second wheel 40 is included in the interior space provided between the first frame member 14 and the second frame member 16. The second wooden wheel 40 is secured in place at the rear end 12b of the wooden frame 12.

An unexpected benefit is provided by the first wheel 38 and the second wheel 40. As both wheels 38, 40 are made from wood, the child's safety is increased while riding or otherwise near the wooden push or balance bicycle 10. As conventional-type of bicycles typically include a spoke wheel, the wooden wheel does not include any areas for a child's feet or fingers to be inserted and pinched. Also, the wooden wheels 38, 40 add stability and structural integrity to the wooden push or balance bicycle 10.

The first wooden wheel 38 and the second wooden wheel 40 each include a pneumatic air tire 42 (as shown on the first wooden wheel 38).

As the pneumatic tires 42 are inflated, it provides a smoother and more comfortable ride for the rider of the wooden push or balance bicycle 10. A preferred pounds per square inch (psi) tire pressure for the tires is thirty-five psi.

If preferred, the wooden wheels 38, 40 may also include a solid tire 44 (as shown on the second wheel 40). The solid tire 44 is preferably made of solid rubber or plastic.

Since the solid tire 44 does not require inflation, an unexpected benefit is provided. Unlike the pneumatic tire 42, the solid wheel does not include a valve for inflation of air. Therefore, the solid tire 44 will not leak air or become flat. This allows constant riding of the wooden push or balance bicycle 10 without the need for checking tire pressure.

Either of the tires 42, 44 provide traction on unstable ground (i.e., loose gravel) or on slippery surfaces and can be used indoors or outdoors.

To use the wooden push or balance bicycle 10, the child mounts the bicycle 10 by raising one leg over the wooden frame 12. As mentioned previously, the downward curvature 15 of the wooden frame 12 allows the child to clear the wooden frame 12.

The child sits upon the seat cushion 24 of the adjustable seat 20 and grasps foam grips 36 located the handlebar 34.

As there are no pedals to propel the wooden push or balance bicycle 10 forward, the child will need to provide a force to gain momentum. The child places their feet upon the ground surface and begins to walk with their feet while still sitting upon the seat 20. Also the child may place both feet firmly on the ground surface and push themselves forward with their feet.

After the child has gained enough momentum to keep the wooden push or balance bicycle 10 steadily moving forward, the child may then raise their feet, if desired. The feet are placed on the foot pegs 28 and the child can balance themselves upon the bicycle 10 and is further able to coast while riding the bicycle 10.

The handlebar 34 is used to steer the front wheel 38 either left or right. As the wooden push or balance bicycle 10 does not include brakes, the child simply removes their feet from the foot pegs 28 and places them back down on the ground surface to stop the bicycle 10 by frictional engagement with the ground surface.

The wooden push or balance bicycle 10 affords a child a sense of freedom and also provides a unique training tool to prepare the child for riding a conventional-type of bicycle.

The wooden push or balance bicycle 10 is an alternative to using training wheels or any other means for helping a child learn to ride a bicycle at an early age.

An instructions manual (not shown) is included with the wooden push or balance bicycle 10 to provide detailed instructions for assembly. Also included are a complete set of required hardware to secure various parts of the bicycle 10 together and a set of required tools for use in the assembly of the wooden push or balance bicycle 10.

In order to provide convenient packaging of the wooden push or balance bicycle 10, the bicycle 10 is packaged partially assembled. By not shipping the bicycle 10 fully assembled, manufacturing and labor costs are lowered.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A wooden push or balance bicycle, comprising:
(a) a wooden frame that includes a first frame member and a second frame member, and wherein said wooden frame includes a first end and an opposite second end, and wherein said first frame member and said second frame member are attached together at said first end thereof and wherein said first frame member and said second frame member are disposed a predetermined distance apart from each other at said second end, and wherein said first frame member and said second frame member are disposed adjacent to one-another, and wherein said first frame member and said second frame member include a generally downward concave curvature;
(b) means for securing an elongated member to said wooden frame between said first frame member and said second frame member at a lowest point of said concave curvature, wherein said lowest point is disposed approximately midway between said first end and said second end, and wherein an upper end of said elongated member includes a seat; and
(c) a rear wheel attached to said second end of said wooden frame between said first frame member and said second frame member, a front fork pivotally attached to said wooden frame at said first end of said wooden frame, a front wheel attached to said front fork, and a handlebar attached to an upper end of said front fork for pivoting said front fork with respect to a longitudinal axis of said wooden frame.

2. The wooden push or balance bicycle of claim 1 including a pair of footrests, wherein each of said pair of footrests is attached to an opposite side of said wooden frame, and wherein each of said pair of footrests is disposed near a lower central portion of said wooden frame.

3. The wooden push or balance bicycle of claim 2 wherein said lower central portion of said wooden frame includes an elongated portion of said wooden frame that extends lower toward a ground surface than a remainder of said wooden frame.

4. The wooden push or balance bicycle of claim 1 wherein an exterior surface of at least a portion of said wooden frame includes a painted coating, and wherein said painted coating is adapted for writing on said painted coating with chalk after said painted coating has fully dried.

5. The wooden push or balance bicycle of claim 4 wherein said painted coating is disposed on an exterior surface of said first frame member or said second frame member.

6. The wooden push or balance bicycle of claim 4 wherein said painted coating is disposed on an exterior surface of said first frame member and said second frame member.

7. The wooden push or balance bicycle of claim 1 including a pair of footrests, wherein each of said pair of footrests is attached to an opposite side of said wooden frame, and wherein each of said pair of footrests is disposed near a lower central portion of said wooden frame and wherein said lower central portion of said wooden frame includes an elongated portion of said wooden frame that extends lower toward a ground surface than a remainder of said wooden frame, and wherein an exterior surface of at least a portion of said wooden frame includes a painted coating, and wherein said painted coating is adapted for writing on said painted coating with chalk after said painted coating has fully dried, and wherein said painted coating is disposed on an exterior surface of said first frame member or said second frame member or on an exterior surface of said first frame member and said second frame member.

8. The wooden push or balance bicycle of claim 1 wherein said seat is attached to said upper end of said elongated member, wherein said seat includes a seat cushion and a fabric covering, and wherein said seat cushion and said fabric covering are detachably-attachable with respect to said seat.

9. The wooden push or balance bicycle of claim 8 wherein said fabric covering is detachably-attachable with respect to said seat cushion.

10. A wooden push or balance bicycle, comprising:
    (a) a wooden frame that includes a first frame member and a second frame member, and wherein said wooden frame includes a first end and an opposite second end, and wherein said first frame member and said second frame member are attached together at said first end thereof and wherein said first frame member and said second frame member are disposed a predetermined distance apart from each other at said second end, and wherein said first frame member and said second frame member are disposed adjacent to one-another, and wherein said first frame member and said second frame member include a generally downward concave curvature;
    (b) means for securing an elongated member to said wooden frame between said first frame member and said second frame member at a lowest point of said concave curvature, wherein said lowest point is disposed approximately midway between said first end and said second end, and wherein an upper end of said elongated member includes a seat; and
    (c) a pair of footrests, wherein each of said pair of footrests is attached to an opposite side of said wooden frame, and wherein each of said pair of footrests is disposed near a lower central portion of said wooden frame; and
    (d) a rear wheel attached to said second end of said wooden frame between said first frame member and said second frame member, a front fork pivotally attached to said wooden frame at said first end of said wooden frame, a front wheel attached to said front fork, and a handlebar attached to an upper end of said front fork for pivoting said front fork with respect to a longitudinal axis of said wooden frame.

11. A wooden push or balance bicycle, comprising:
    (a) a wooden frame that includes a first frame member and a second frame member, and wherein said wooden frame includes a first end and an opposite second end, and wherein said first frame member and said second frame member are attached together at said first end thereof and wherein said first frame member and said second frame member are disposed a predetermined distance apart from each other at said second end, and wherein said first frame member and said second frame member are disposed adjacent to one-another, and wherein said first frame member and said second frame member include a generally downward concave curvature;
    (b) means for securing an elongated member to said wooden frame between said first frame member and said second frame member at a lowest point of said concave curvature, wherein said lowest point is disposed approximately midway between said first end and said second end, and wherein an upper end of said elongated member includes a seat; and
    (c) wherein an exterior surface of at least a portion of said wooden frame includes a painted coating, and wherein said painted coating is adapted for writing on said painted coating with chalk after said painted coating has fully dried; and
    (d) a rear wheel attached to said second end of said wooden frame between said first frame member and said second frame member, a front fork pivotally attached to said wooden frame at said first end of said wooden frame, a front wheel attached to said front fork, and a handlebar attached to an upper end of said front fork for pivoting said front fork with respect to a longitudinal axis of said wooden frame.

\* \* \* \* \*